(12) United States Patent  (10) Patent No.: US 8,581,434 B2
Chan  (45) Date of Patent: Nov. 12, 2013

(54) DEVICE FOR GENERATING ELECTRICITY FROM OCEAN WAVES

(76) Inventor: King Lung Chan, Sunnyvale, CA (US)

( * ) Notice: Subject to any disclaimer, the term of this patent is extended or adjusted under 35 U.S.C. 154(b) by 500 days.

(21) Appl. No.: 12/971,503

(22) Filed: Dec. 17, 2010

(65) Prior Publication Data

US 2012/0153619 A1   Jun. 21, 2012

(51) Int. Cl.
*F03B 13/00* (2006.01)

(52) U.S. Cl.
USPC .................................. 290/54; 290/53; 290/42

(58) Field of Classification Search
USPC ............................. 290/42, 43, 53, 54; 415/4.1
See application file for complete search history.

(56) References Cited

U.S. PATENT DOCUMENTS

| | | | |
|---|---|---|---|
| 647,638 A * | 4/1900 | Todd | 60/505 |
| 4,355,511 A * | 10/1982 | Jones | 60/507 |
| 4,359,868 A | 11/1982 | Slonim | |
| 4,843,249 A | 6/1989 | Bussiere | |
| 4,859,146 A * | 8/1989 | Labrador | 416/8 |
| 5,311,064 A * | 5/1994 | Kumbatovic | 290/53 |
| 6,711,897 B2 * | 3/2004 | Lee | 60/507 |
| 7,759,813 B2 * | 7/2010 | Fujisato | 290/53 |

FOREIGN PATENT DOCUMENTS

KR   10-0801320 B1   2/2008

OTHER PUBLICATIONS

International Search Report and Written Opinion mailed Jun. 28, 2012, for International Application No. PCT/US2011/063775, filed Dec. 7, 2011, 9 pages.

\* cited by examiner

*Primary Examiner* — Nicholas Ponomarenko
(74) *Attorney, Agent, or Firm* — Blakely Sokoloff Taylor & Zafman LLP

(57) ABSTRACT

According to one aspect of the invention, a device for converting kinetic energy of water waves to electrical power includes a turbine structure having multiple blades evenly attached to a first shaft, a first pulley wheel attached to the first shaft, a second pulley wheel attached to a second shaft disposed in parallel with the first shaft, an electricity generator is attached to the second shaft, and a platform is configured to support the turbine structure, the platform having an upper deck and a lower deck coupled to each other via a hinge. The upper deck is tilted from the lower deck via the hinge such that the first shaft is positioned with an inclining angle with respect to the water surface. The inclining angle is configured such that a distance and time for each fin to travel under the water surface between the entry point and exiting point are maximized while being near to the water surface.

20 Claims, 7 Drawing Sheets

DEVICE FOR GENERATING ELECTRICITY FROM OCEAN WAVES

FIELD OF THE INVENTION

Embodiments of the present invention relate generally to generation of electric power. More particularly, embodiments of the invention relate to generating electricity from ocean waves.

BACKGROUND

The energy of the waves is greatest in open sea far from shore. Closer to shore, wave energy is dissipated due to bottom friction and diffraction effects. Many wave energy converters use floats that bob up and down on the wave with relation to the seabed, this movement may be used to generate electricity. However these type of energy converters intrinsically only harvest a small proportion of the wave's energy even if erected in open sea. A wave's energy could be regarded as linear, perpendicular and/or parallel to the gravity of the earth. The energy that is parallel to the earth's gravity can be looked at as alternating in direction. Many methods for converting wave energy to electrical energy, particularly float based systems, have low efficiencies when attempting to convert alternating linear energy to the unidirectional rotation of a generator shaft.

SUMMARY OF THE DESCRIPTION

According to one aspect of the invention, a device for converting kinetic energy of water waves to electrical power includes a turbine structure having multiple blades evenly attached to a first shaft, where each blade includes an elongate arm having a near end and a far end. The near end is fixedly attached to the first shaft and the far end is attached with a fin, wherein each blade is perpendicularly attached to the first shaft. The device further includes a first pulley wheel attached to the first shaft. When the turbine structure rotates, the turbine structure causes the first shaft to rotate which causes the first pulley wheel to rotate. The device further includes a second pulley wheel attached to a second shaft disposed in parallel with the first shaft, where the second pulley wheel is coupled to the first pulley wheel via a belt or gear mechanism. When the first pulley wheel rotates, the first pulley wheel drives the second pulley to rotate via the belt or gear mechanism. An electricity generator is attached to the second shaft. When the second pulley wheel rotates, the second pulley wheel causes the second shaft to rotate which enables the electricity generator to generate electricity. A platform is configured to support the turbine structure, the platform having an upper deck and a lower deck coupled to each other via a hinge. The lower deck is horizontally positioned above a water surface and the upper deck is configured to tilt in a plurality of angles via the hinge. The first shaft is perpendicularly attached to the upper deck of the platform, such that when the upper deck is tilted from the lower deck via the hinge, the first shaft is positioned with an inclining angle with respect to the water surface that is greater than zero degree and less than 90 degrees. A fin of each blade of the turbine structure can be rotated into the water surface from an entry point, pushed by water waves, and rotated out from the water surface from an exiting point. The inclining angle is configured such that a distance and time for each fin to travel under the water surface between the entry point and exiting point are maximized while being near to the water surface. Before a fin of a first of the plurality of blades is completely rotated out from the exiting point of the water surface, a fin of at least a second of the plurality of blades has been completely rotated into the entry point of the water surface, such that there is a fin of at least one of the blades is under the water surface at any given time.

According to another aspect of the invention, a device for converting kinetic energy of water waves to electrical power includes a turbine structure having multiple blades evenly attached to a first shaft. Each blade includes an elongate arm having a near end and a far end, where the near end is fixedly attached to the first shaft and the far end is attached with a fin. Each blade is perpendicularly attached to an elongate axis of the first shaft. A first pulley wheel is attached to the first shaft, where when the turbine structure rotates, the turbine structure causes the first shaft to rotate which causes the first pulley wheel to rotate. A second pulley wheel is attached to a second shaft. The second pulley wheel coupled to the first pulley wheel via a belt or gear mechanism. When the first pulley wheel rotates, the first pulley wheel drives the second pulley to rotate via the belt or gear mechanism. An electricity generator is attached to the second shaft, where when the second pulley wheel rotates, the second pulley wheel causes the second shaft to rotate which enables the electricity generator to generate electricity. The device further includes a platform horizontally positioned above a water surface to support the first shaft of the turbine structure and the second shaft. The first shaft is attached to the platform with an inclining angle with respect to the water surface that is greater than zero degree and less than 90 degrees. A fin of each blade of the turbine structure can be rotated into the water surface from an entry point, pushed by water waves, and rotated out from the water surface from an exiting point. The inclining angle is configured such that a distance and time for each fin to travel under the water surface between the entry point and exiting point are maximized while the fin travels near to the water surface. Before a fin of a first of the plurality of blades is completely rotated out from the exiting point of the water surface, a fin of at least a second of the plurality of blades has been completely rotated into the entry point of the water surface, such that there is a fin of at least one of the blades is under the water surface at any given time.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a device is designed to convert the kinetic energy of a moving ocean wave or the kinetic energy of a moving body of water such as water moving in a river or a stream into useful electricity. In one embodiment, a device employs a turbine like structure having a central shaft having multiple blades disposed thereon, where the blades are distributed in a symmetric manner with respect to the central shaft and positioned perpendicular to an axis of the central shaft. Each blade includes an elongate arm and a fin. The arm includes a near end attached to the central shaft and a far end coupled with the fin, which is in a predetermined shape such as a rectangular oval shape. In one embodiment, the central shaft is positioned inclining in a predetermined angle with respect to the water surface, which allows at least one of the fins contacting the water waves at a given time.

As a result, when the water waves push one or more fins, they cause the fins to brush or sweep the water surface. The moving fins cause the corresponding blades to rotate with respect to an axis of the central shaft, which also cause the central shaft to rotate. The rotation of the central shaft is utilized to power an electricity generator to generate electrical power. In one embodiment, the predetermined angle is less than a right angle and greater than zero. The inclining angle is designed such that each fin, when being rotated into the surface of water, can maintain in contact with the water in a maximum distance or time before leaving the water surface. The number of the blades may be determined dependent upon the inclining angle to ensure that at least one fin is in contact with the water at any given moment. That is, before a first fin is completely rotated out from the water, at least a second fin has been at least partially rotated into the water.

Figure 1:
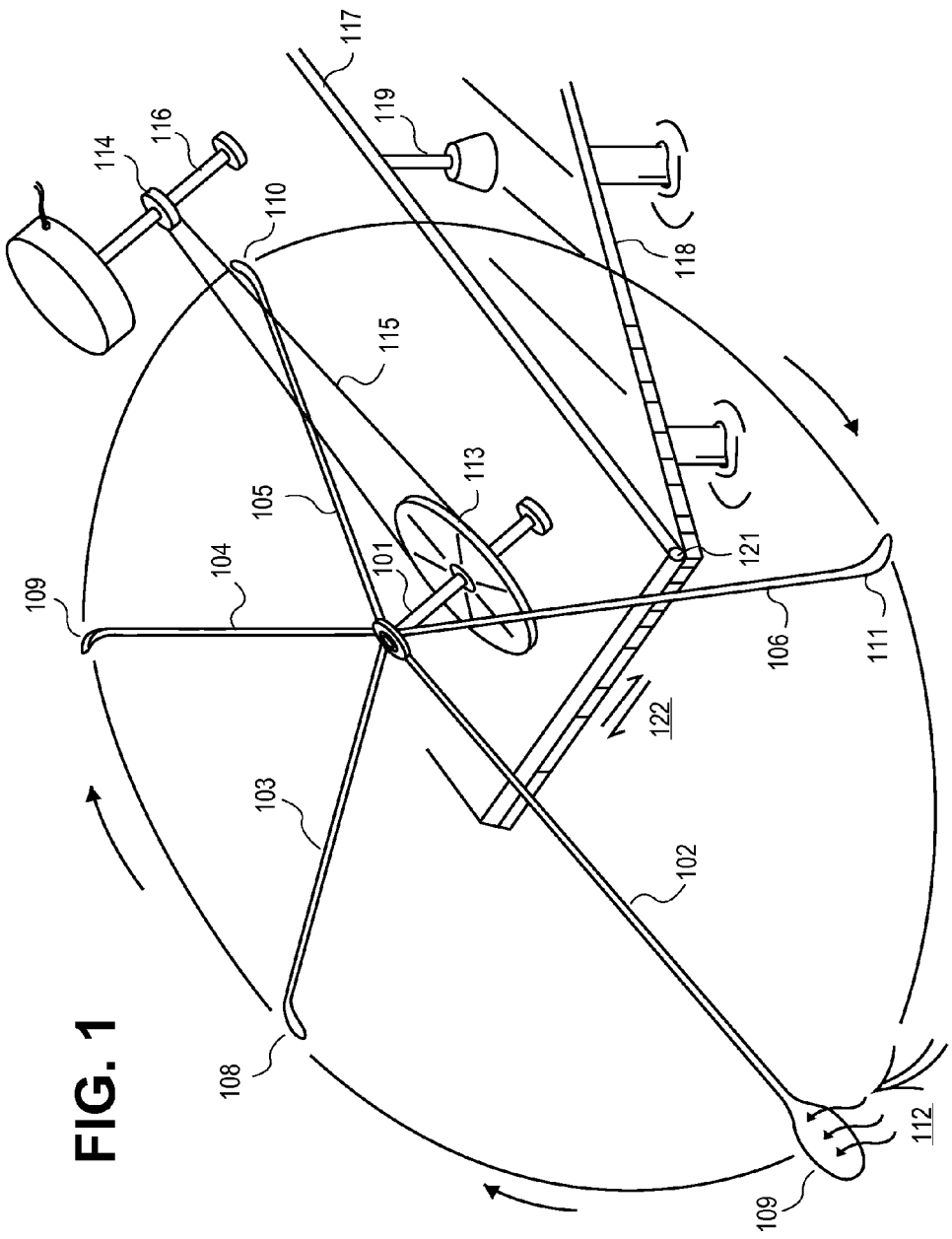
FIG. 1 is a block diagram illustrating a perspective view of a device to convert kinetic energy from water waves into electricity according to one embodiment of the invention.

FIG. 1 is a block diagram illustrating a perspective view of a device to convert kinetic energy from water waves into electricity according to one embodiment of the invention. Referring to FIG. 1, a device is designed to convert the kinetic energy of a moving ocean wave or the kinetic energy of a moving body of water such as water moving in a river or a stream into useful electricity. In one embodiment, a device includes a turbine or turbine like structure including central shaft 101 (also referred to as a primary shaft) and multiple substantially identical blades, which include multiple arms such as arms 102-106 (also referred to as leverage arms) disposed thereon, where arms 102-106 are distributed in a symmetric manner with respect to central shaft 101 and positioned perpendicular to an axis of central shaft 101, forming a spoke wheel or turbine like structure.

Each arm includes a near end attached to the central shaft and a far end coupled with a fin such as fins 107-111. The shape of a fin can be implemented in any shape that can receive forces generated from water waves. In one embodiment, a fin can have a rectangular oval shape. Alternatively, a fin can have a bowl like shape to receive a relatively large amount of water waves. In one embodiment, central shaft 101 is positioned inclining in a predetermined angle with respect to the water surface, which allows at least one of the fins contacting the water waves at a given time. As a result, when the water waves push one or more fins as indicated by wave direction 112, they cause the fins to brush or sweep the water surface, which causes arms 102-106 to rotate with respect to central shaft 101.

In addition, central shaft 101 includes first pulley wheel 113 attached thereon. Further, the device further includes secondary shaft 116 disposed having second pulley wheel 114 attached thereon. Pulley wheels 113-114 are coupled to each other via belt 115, which may be made from rubber or rubber like material. Alternatively, pulley wheels 113-114 may be implemented as gears engaged with each other, without using a belt. When water waves push at least one of fins 107-111, they cause central shaft 101 to rotate. When central shaft 101 rotates, it causes pulley wheel 113 to rotate, which further causes pulley wheel 114 to rotate via belt 115 or via a gear mechanism. In one embodiment, the diameter of pulley wheel 113 is relatively larger than the diameter of pulley wheel 114 such that the speed of rotation of pulley wheel 114 is higher than the speed of pulley wheel 113. Note that there may be one or more additional intermediate shafts between central shaft 101 and secondary shaft 116 with proper sizes of pulley wheels and belts to further enhance the speed of pulley wheel 114 of secondary shaft 116. When pulley wheel 114 rotates, it causes secondary shaft 116 to rotate. The rotation of secondary shaft 116 enables electricity generator 120 to generate electricity. Thus, the device is able to convert the kinetic energy generated from the moving water waves into electrical power.

In one embodiment, the predetermined angle (also referred to as an inclining angle) between an axis of central shaft 101 and the water surface is less than a right angle and greater than zero degree. In one embodiment, both central shaft 101 and secondary shaft 116 are disposed on a platform having upper deck 117 and lower deck 118 coupled to upper deck 117 via hinge 121. In one embodiment, central shaft 101 and secondary shaft 116 are positioned vertically with respect to the surface of upper deck 117. In one embodiment, lower deck 118 is positioned horizontally above the water surface while upper deck 117 can be tilted or inclined via hinge 121 to a variety of angles via hydraulic or mechanical lift or jack mechanism 119. By adjusting the tilted angle of upper deck 117, the inclining angle of central shaft 101 can also be adjusted accordingly.

The inclining angle of central shaft 101 is designed in a way such that each fin, when being rotated into the surface of water, can maintain in contact with the water in a maximum distance or time before leaving the water surface, yet close to the water surface. In addition, the inclining angle can also be adjusted such that the fins can contact the water surface in various levels of the water, such as, for example, a high tide and/or a low tide of the ocean surface. In one embodiment, the inclining angle of central shaft 101 is ranging from approximately 60-80 degrees, preferably 70 degrees. In a further embodiment, upper deck 117 can slide back and forth (as indicated by direction 122) with respect to lower deck 118 via hinge 121 to accommodate the water waves. The number of the fins and arms may be determined dependent upon the inclining angle to ensure that at least one fin is in contact with the water at any given moment. That is, before a first fin is completely rotated out from the water, at least a second fin would have been at least partially rotated into the water.

Figure 2:
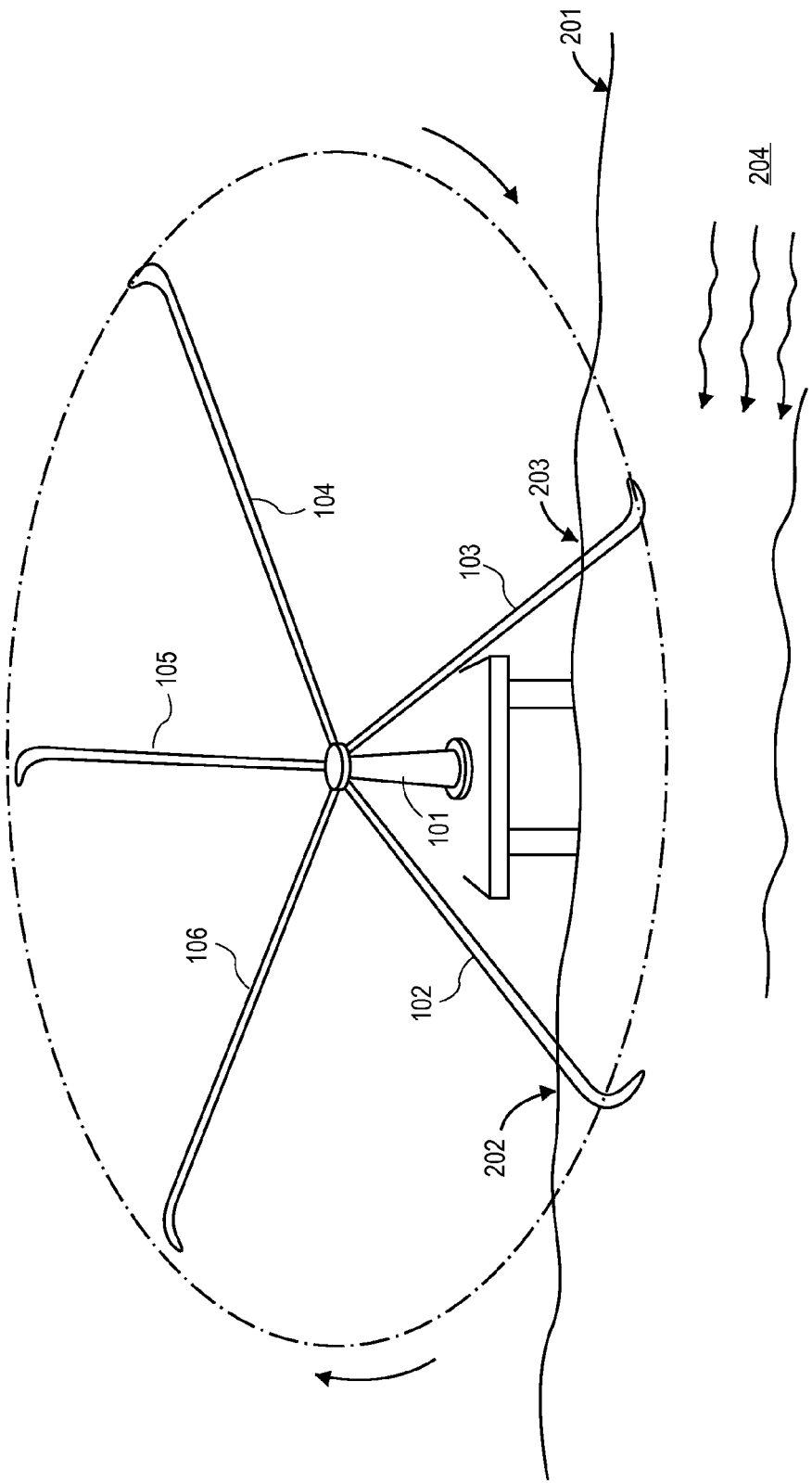
FIG. 2 is a diagram illustrating a side view of a device for converting water wave kinetic energy to electrical power according to one embodiment of the invention.

FIG. 2 is a diagram illustrating a side view of a device for converting water wave kinetic energy to electrical power according to one embodiment of the invention. For example, the device as shown in FIG. 2 may be implemented as part of the device shown in FIG. 1. For the illustration purpose, certain reference numbers referring to certain elements having similar or identical functionalities are maintained the same. As described above, the inclining angle of central shaft 101 is designed in such way that there is at least one fin in contact with water wave at any given moment, while maximizing or prolonging the time or distance that the at least one fin travels through the water waves. In this example, referring to FIG. 2, for the purpose of illustration, there are five arms 102-106 relatively evenly distributed, each having a respective fin attached to its far end. However, it is not so limited; more or fewer arms and fins may be implemented.

In one embodiment, central shaft 101 is positioned with an inclining angle with respect to the surface of the water waves, such that each fin can enter water surface at entry point 203 and leave the water surface at exiting point 202. Between points 203 and 202, water waves 204 can push the corresponding fin which in turn rotates central shaft 101. The inclining angle is designed to enable the fins to travel in the water in a maximized distance between entry point 203 and exiting point 202, yet close to water surface 201 where the water waves tend to be stronger. In one embodiment, the inclining angle is ranging approximately from 60-80 degrees, preferably approximately 70 degrees.

Figure 3:
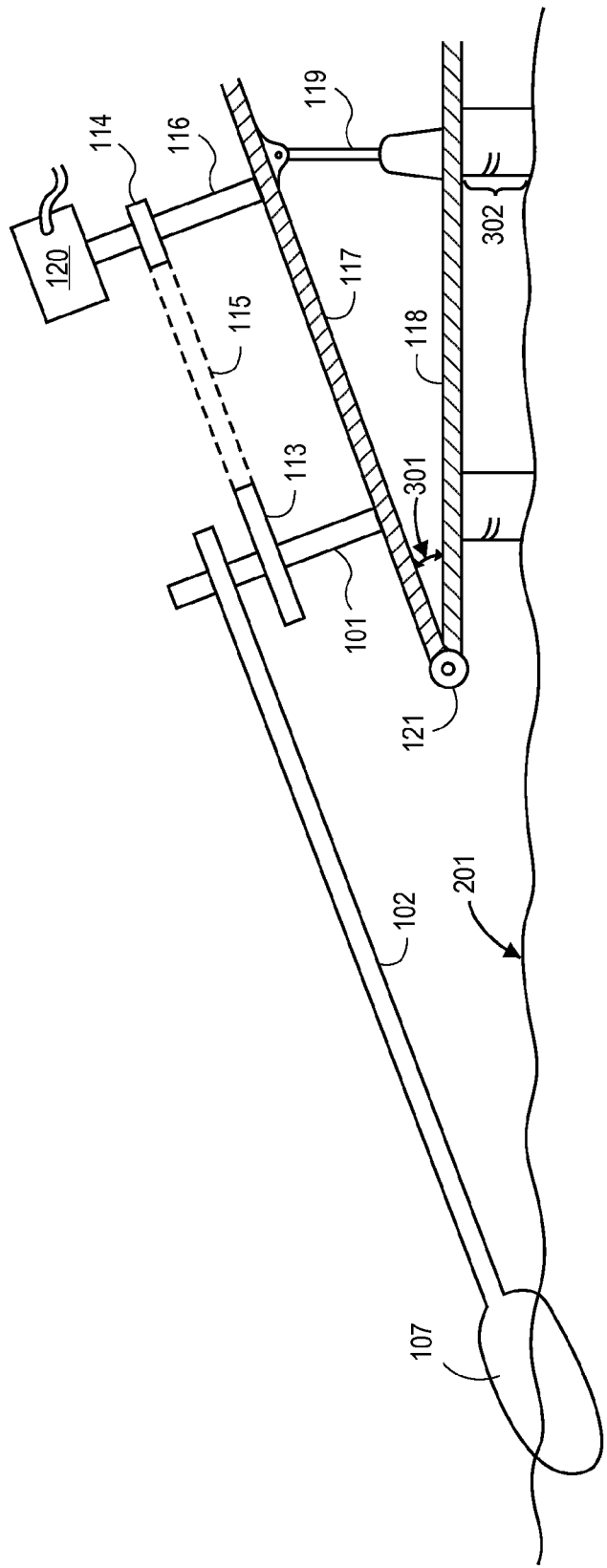
FIG. 3 is a diagram illustrating a side view of a device for converting water wave kinetic energy to electrical power according to another embodiment of the invention.

FIG. 3 is a diagram illustrating a side view of a device for converting water wave kinetic energy to electrical power according to another embodiment of the invention. For example, the device as shown in FIG. 3 may be implemented as part of the one shown in FIG. 1 and/or FIG. 2. For the illustration purpose, certain reference numbers referring to certain elements having similar or identical functionalities are maintained the same. Referring to FIG. 3, in this embodiment, central shaft 101 and secondary shaft 116 are disposed vertically on upper deck 117, where upper deck 117 is coupled to lower deck 118 via hinge 121. That is, arm 102 is configured to be relatively parallel with the surface of upper deck 117. Hinge 121 allows upper deck 117 to be tilted in a variety of angles. In one embodiment, angle 301 may be ranging approximately from 10 to 30 degrees, preferably approximately 20 degrees. Lower deck 118 is fixedly positioned and properly supported above water surface 201, preferably approximately 8 feet above water surface 201 as indicated by reference number 302. In the ocean situation, lower deck 118 may be positioned approximately 8 feet above the average ocean surface (e.g., average tide).

The length of arm 102 may vary dependent upon the specific situation. In one embodiment, the length of arm 102 is ranging approximately from 10 to 20 meters, preferably approximately 15 meters. However, it is not so limited; arm 102 may be longer than 15 meters or at least 15 meters. Arm 102 can be made from any kind of materials, preferably strong and light weight such as aluminum alloy type of materials. Similarly, fin 107 can be made from any kind of materials, preferably strong and light weight such as aluminum alloy type of materials. Fin 107 can be designed in a variety of shapes such as rectangular or rectangular oval shape, etc. In one embodiment, fin 107 has a bowl like shape that can receive or contain amount of water from water waves. In one embodiment, the area of fin 107 is ranging approximately from 1 to 2 square meters ($m^2$), preferably approximately 1.5 $m^2$.

Figure 4:
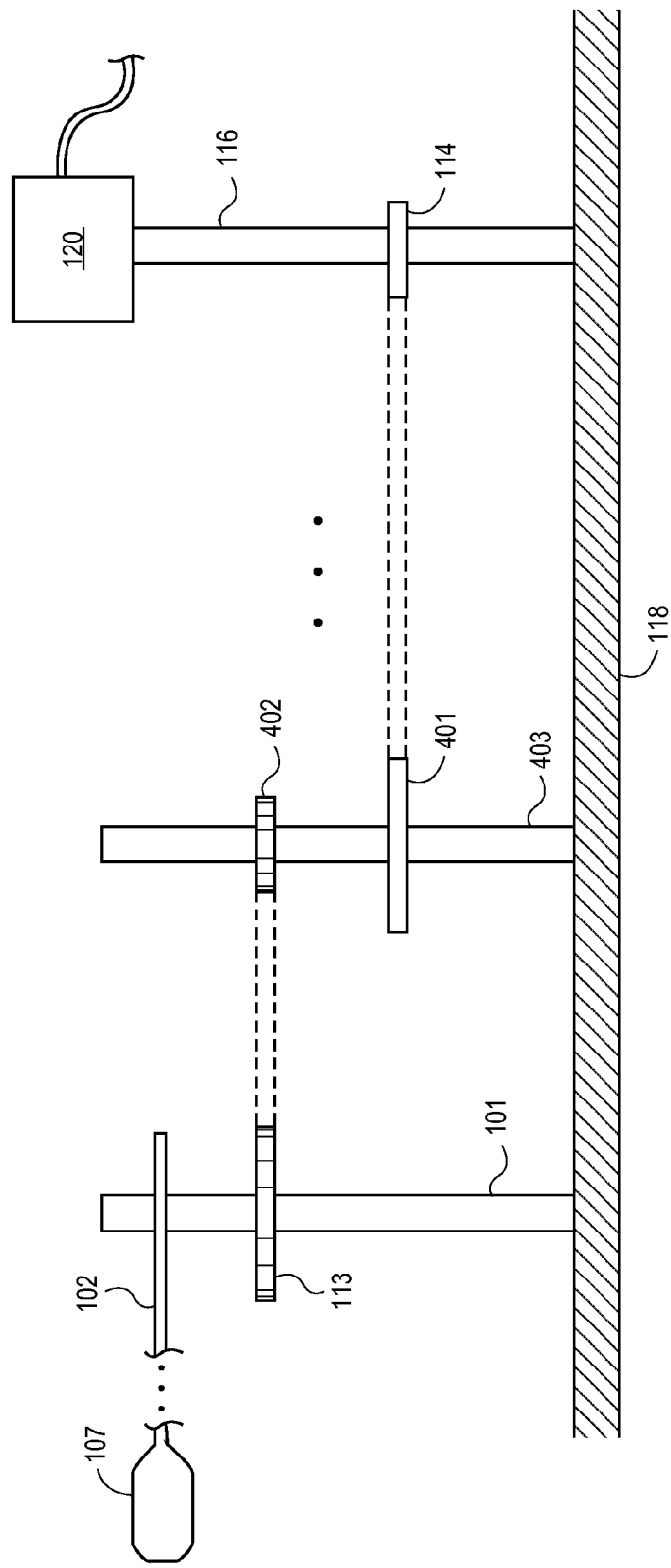
FIG. 4 is a diagram illustrating a side view of a device for converting water wave kinetic energy to electrical power according to another embodiment of the invention.

As described above, pulley wheel 113 disposed on central shaft 101 is desired to have a diameter larger than pulley wheel 114 disposed on secondary shaft 116 to increase the rotating speed of shaft 116. In one embodiment, the diameter of pulley wheel 113 is at least three times larger than the diameter of pulley wheel 114. In one embodiment, the diameter of pulley wheel 113 is ranging approximately from 8 to 10 feet, preferably approximately 9 feet. The diameter of pulley wheel 114 is ranging approximately from 1.5 to 2.5 feet, preferably approximately 2 feet. Note that there may be one or more additional intermediate pulley wheels (e.g., wheels 401-402) disposed on one or more intermediate shafts (e.g., shaft 403) between pulley wheel 113 of shaft 101 and pulley wheel 114 of shaft 116, as shown in FIG. 4. Also note that wheels 113-114 and belt 115 may be replaced by a gear type mechanism, where wheels 113-114 may be implemented as gears directly engaged with each other without using belt 115.

Figure 5:
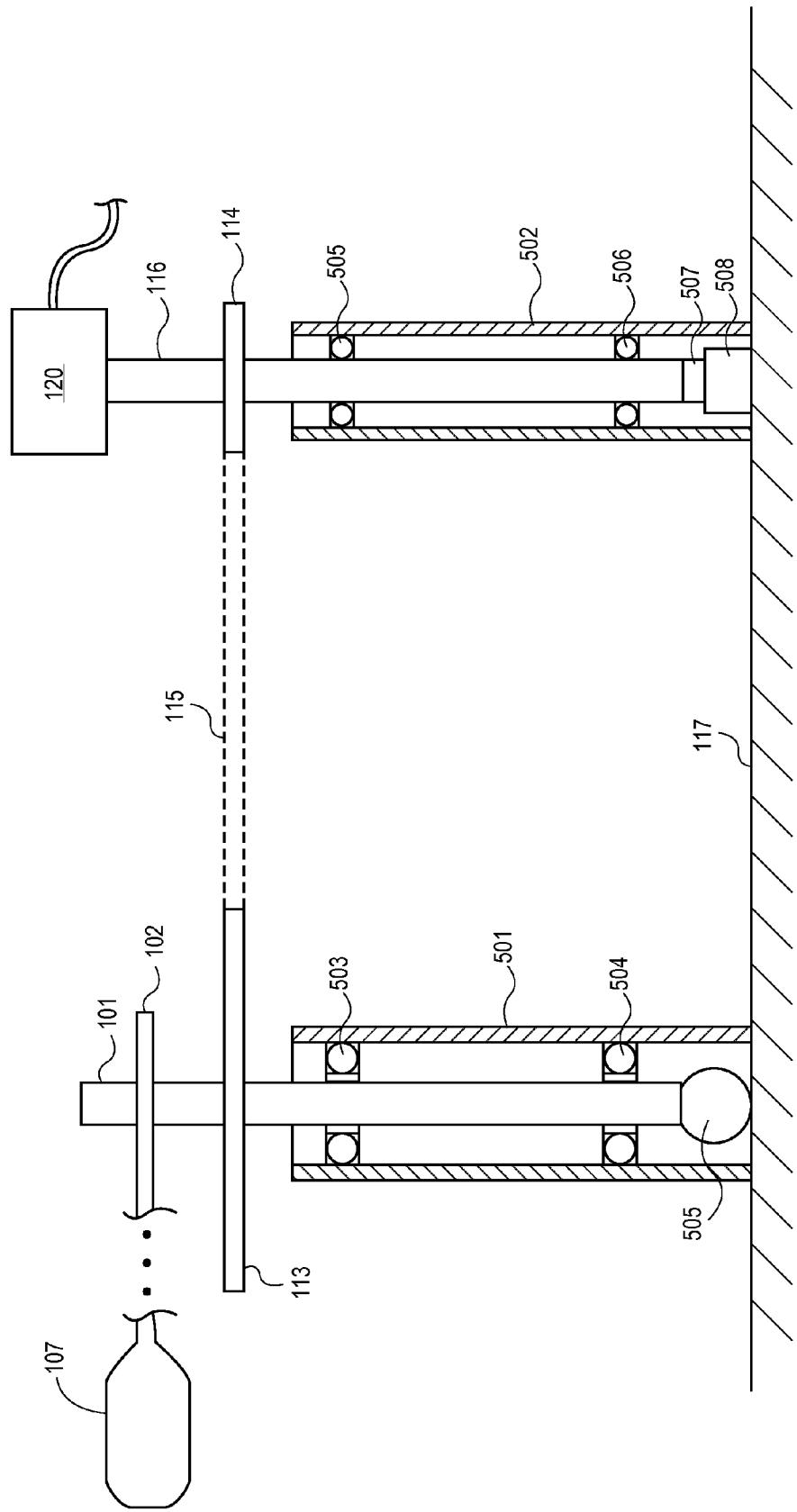
FIG. 5 is a diagram illustrating a cross-section of shafts used in a device for converting water wave kinetic energy to electrical power according to one embodiment of the invention.

FIG. 5 is a diagram illustrating a cross-section of shafts used in a device for converting water wave kinetic energy to electrical power according to one embodiment of the invention. For example, the device as shown in FIG. 3 may be implemented as part of the one shown in FIG. 1. For the illustration purpose, certain reference numbers referring to certain elements having similar or identical functionalities are maintained the same. Referring to FIG. 5, each of central shaft 101 and secondary shaft 116 is supported by a support structure. In one embodiment, central shaft 101 is supported by tubular shell 501 and secondary shaft 116 is supported by tubular shell 502. Tubular shells 501-502 are fixedly disposed on upper deck 117 while central shaft 101 and secondary shaft 116 may rotate freely within the tunnels of tubular shells 501-502, respectively.

In one embodiment, there are at least two ball bearing structures disposed between an outer wall or surface of central shaft 101 and an inner wall or surface of tubular shell 501 to reduce friction between the two. A ball bearing is a type of rolling-element bearing that uses balls to maintain the separation between the moving parts of the bearing. The purpose of a ball bearing is to reduce rotational friction and support radial and axial loads. It achieves this by using at least two races to contain the balls and transmit the loads through the balls. Usually one of the races is held fixed (e.g., to an inner wall of the tubular shell). As one of the bearing races (e.g., attached to an outer wall of the shaft) rotates it causes the balls to rotate as well. Because the balls are rolling they have a much lower coefficient of friction than if two flat surfaces were rotating on each other.

In one particular embodiment, the ball bearing structure for central shaft 101 includes at least upper ball bearing 503 and lower ball veering 504. Ball bearing 503 may be disposed closer (e.g., within a predetermined proximity) to an upper end of tubular shell 501 while ball bearing 504 may be disposed closer to a lower end of tubular shell 501. In one embodiment, at least one of the ball bearings is a ratchet ball bearing that allows central shaft 101, which is fixedly wrapped around by an inner ring of the ball bearings, to rotate in a single direction (e.g., along the direction of water waves). According to a further embodiment, a lower end of central shaft 101 is deposited on the top of a lubricated hard metal ball 505 to provide better support with less friction.

Similarly, there are at least two ball bearing structures disposed between secondary shaft 116 and tubular shell 502 to reduce friction between the two. The ball bearing structure for secondary shaft 116 includes at least upper ball bearing 505 and lower ball veering 506. Ball bearing 505 may be disposed closer to an upper end of tubular shell 502 while ball bearing 506 may be disposed closer to a lower end of tubular shell 502. In one embodiment, at least one of the ball bearings is a ratchet ball bearing that allows secondary shaft 116, which is fixedly wrapped around by an inner ring of the ball bearings, to rotate in a single direction (e.g., along the direction of water waves).

According to another embodiment, secondary shaft 116 includes magnet 507 attached to a lower end of shaft 116. Secondary shaft 116 with magnet 507 attached thereon is deposited on the top of magnet 508 disposed on upper deck 117. In one embodiment, both magnet 507 and magnet 508 have the same polarity such that they reject or push away from each other with magnetic forces to further reduce friction in between. Note that the lubricated ball structure employed on shaft 101 may be employed on shaft 116, or vice versa.

Figure 6:
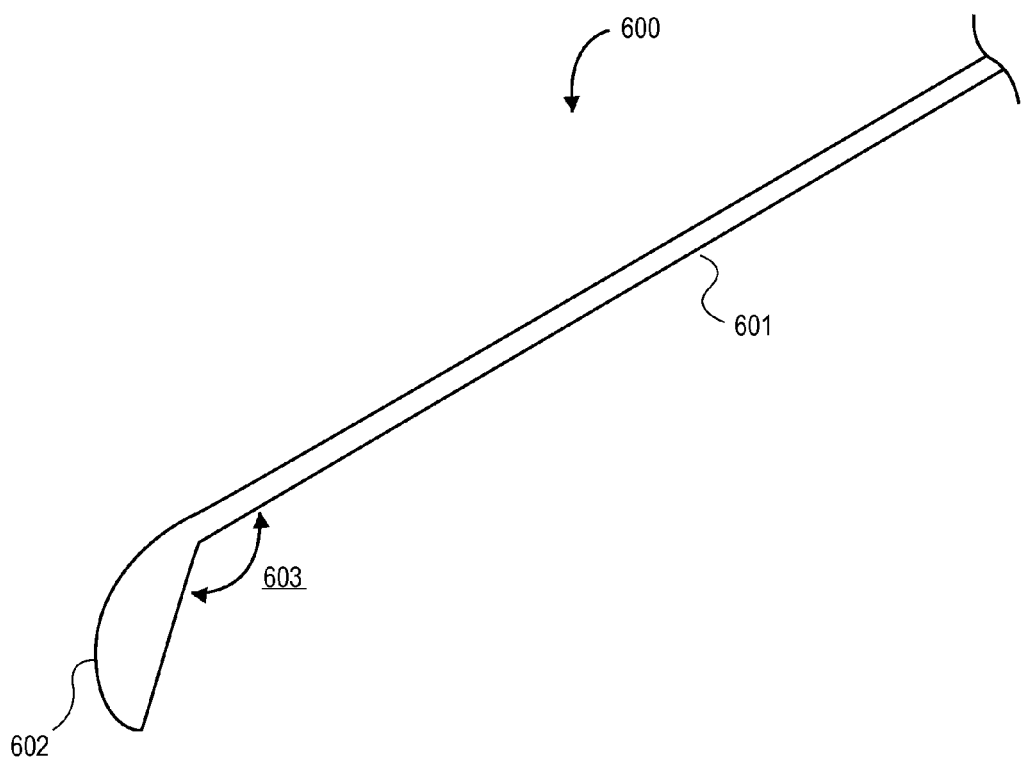
FIG. 6 is a diagram illustrating a side view of an arm and fin of a device for converting water wave kinetic energy to electrical power according to one embodiment of the invention.

FIG. 6 is a diagram illustrating a side view of an arm and fin of a device for converting water wave kinetic energy to electrical power according to one embodiment of the invention. For example, element 600 may be implemented as any of the corresponding elements (e.g., arms 102-106 and fins 107-111) as shown in FIG. 1. In one embodiment, element 600 includes arm 601 and fin 602. Fin 602 is attached to a far end of arm 601 and the near end of arm 601 may be attached to a central shaft such as central shaft 101 of FIG. 1. In one embodiment, fin 602 and arm 601 are attached to each other with angle 603 that is larger than a right angle. In one embodiment, angle 603 is ranging approximately from 100 to 120 degrees, preferably approximately 110 degrees.

Figure 7:
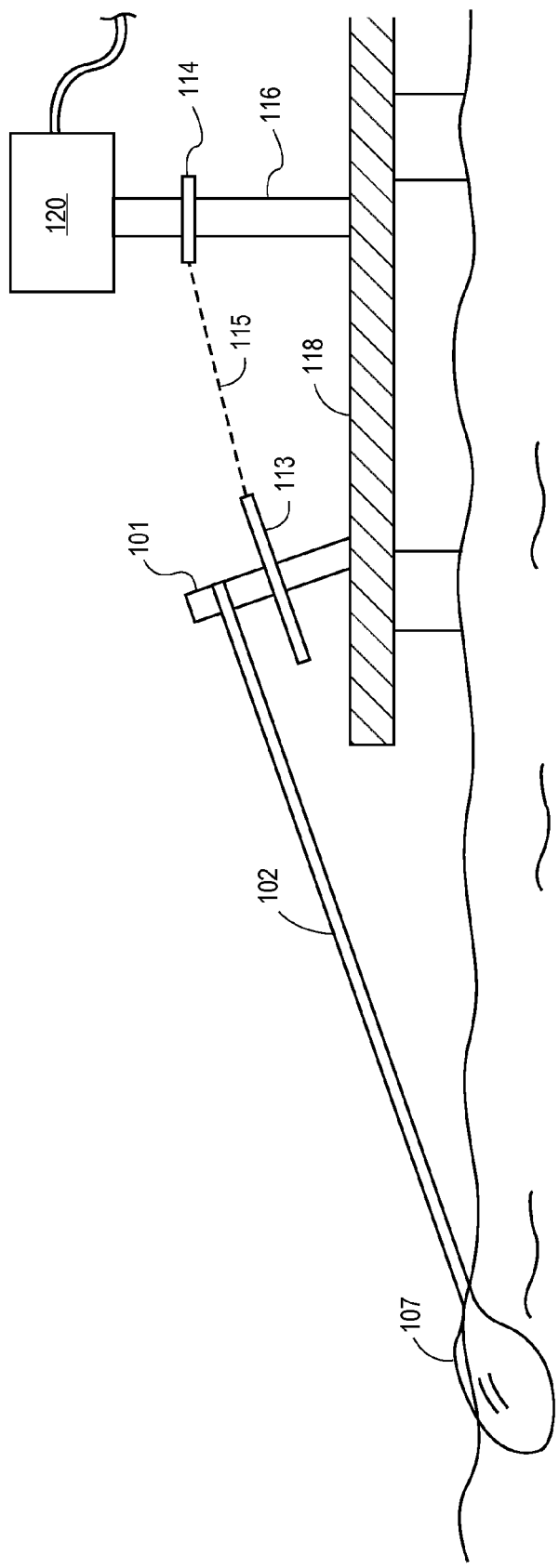
FIG. 7 is a diagram illustrating a device for converting water wave kinetic energy to electrical power according to another embodiment of the invention

FIG. 7 is a diagram illustrating a device a device for converting water wave kinetic energy to electrical power according to another embodiment of the invention. Referring to FIG. 7, in this embodiment, central shaft 101 and secondary shaft 116, as well as any intermediate shaft, are disposed directly on lower deck 118, which is in a relatively horizontal orientation, without using upper deck 117. In one embodiment, central shaft 101 is attached to lower deck 118 inclined with an inclining angle as described above. The inclining angle is ranging approximately from 60 to 80 degrees, preferably approximately 70 degrees. Secondary shaft 116, as well as any intermediate shaft, may be attached to lower deck 118 vertically. Alternatively, secondary shaft 116 and/or any intermediate shaft may be attached with an inclining angle with respect to lower deck 118. Secondary shaft 116 and/or any intermediate shaft may be attached in parallel with central shaft 101. Other configurations may also exist.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for converting kinetic energy of water waves to electrical power, the apparatus comprising:
    a turbine structure having a plurality of blades evenly attached to a first shaft, each blade including an elongate arm having a near end and a far end, wherein the near end is fixedly attached to the first shaft and the far end is attached with a fin, wherein each blade is perpendicularly attached to the first shaft;
    a first pulley wheel attached to the first shaft, wherein when the turbine structure rotates, the turbine structure causes the first shaft to rotate which causes the first pulley wheel to rotate;
    a second pulley wheel attached to a second shaft disposed in parallel with the first shaft, the second pulley wheel coupled to the first pulley wheel via a belt or gear mechanism, wherein when the first pulley wheel rotates, the first pulley wheel drives the second pulley to rotate via the belt or gear mechanism;
    an electricity generator attached to the second shaft, wherein when the second pulley wheel rotates, the second pulley wheel causes the second shaft to rotate which enables the electricity generator to generate electricity; and
    a platform to support the turbine structure, the platform having an upper deck and a lower deck coupled to each other via a hinge, wherein the lower deck is horizontally positioned above a water surface and the upper deck is configured to tilt in a plurality of angles via the hinge,
    wherein the first shaft is perpendicularly attached to the upper deck of the platform, such that when the upper deck is tilted from the lower deck via the hinge, the first shaft is positioned with an inclining angle with respect to the water surface that is greater than zero degree and less than 90 degrees,
    wherein a fin of each blade of the turbine structure can be rotated into the water surface from an entry point, pushed by water waves, and rotated out from the water surface from an exiting point, wherein the inclining angle is configured such that a distance and time for each fin to travel under the water surface between the entry point and exiting point are maximized while being near to the water surface, and
    wherein before a fin of a first of the plurality of blades is completely rotated out from the exiting point of the water surface, a fin of at least a second of the plurality of blades has been completely rotated into the entry point of the water surface, such that there is a fin of at least one of the blades is under the water surface at any given time.

2. The apparatus of claim 1, wherein the plurality of blades comprises at least five blades evenly attached to the first shaft with approximately 72 degrees apart between two adjacent blades.

3. The apparatus of claim 2, wherein the inclining angle of the first shaft is approximately 70 degrees.

4. The apparatus of claim 1, wherein an elongate arm of each blade is at least 15 meter long.

5. The apparatus of claim 4, wherein a contacting area of a fin of each blade is approximately 1.5 square meters.

6. The apparatus of claim 5, wherein a fin of each blade is attached to the corresponding elongate arm titled with an angle approximately 110 degrees.

7. The apparatus of claim 1, wherein a diameter of the first pulley wheel is approximately 8 feet long and a diameter of the second pulley wheel is approximately 2 feet long.

8. The apparatus of claim 1, further comprising:
    a first tubular shell fixedly and perpendicularly attached to the upper deck of the platform, wherein the first shaft is disposed within a first tunnel of the first tubular shell and is freely rotatable within the first tunnel;
    a set of at least two ball bearings disposed between an outer surface of the first shaft and an inner surface of the first tubular shell to reduce friction between the first shaft and the first tubular shell when the first shaft rotates within the first tunnel, wherein the set of at least two ball bearings comprises a first upper ball bearing disposed near a first top end of the first shaft and a first lower ball bearing disposed near a first bottom end of the first shaft.

9. The apparatus of claim 8, further comprising a ratchet mechanism disposed on the first upper ball bearing to restrict the first shaft to rotate in a single direction within the first tubular shell.

10. The apparatus of claim 9, further comprising a lubricated hard metal ball disposed between a bottom surface of the first lower end of the first shaft and a surface of the upper deck to further reduce friction between the first shaft and the upper deck when the first shaft rotates within the first tunnel.

11. The apparatus of claim 8, further comprising:
a second tubular shell fixedly and perpendicularly attached to the upper deck of the platform, wherein the second shaft is disposed within a second tunnel of the second tubular shell and is freely rotatable within the second tunnel;
a set of at least two ball bearings disposed between an outer surface of the second shaft and an inner surface of the second tubular shell to reduce friction between the second shaft and the second tubular shell when the second shaft rotates within the second tunnel, wherein the set of at least two ball bearings comprises a second upper ball bearing disposed near a second top end of the second shaft and a second lower ball bearing disposed near a second bottom end of the second shaft.

12. The apparatus of claim 11, further comprising:
a first magnet attached to the second lower end of the second shaft; and
a second magnet disposed between the second lower end of the second shaft and a surface of the upper deck, wherein the first magnet and the second magnet have an identical polarity, such that the first and second magnets reject from each other due to magnetic forces generated from the first and second magnets, to further reduce friction between the second shaft and the upper deck when the second shaft rotates within the second tunnel.

13. The apparatus of claim 12, further comprising a ratchet mechanism disposed on the second upper ball bearing to restrict the second shaft to rotate in a single direction within the second tubular shell.

14. An apparatus for converting kinetic energy of water waves to electrical power, the apparatus comprising:
a turbine structure having a plurality of blades evenly attached to a first shaft, each blade including an elongate arm having a near end and a far end, wherein the near end is fixedly attached to the first shaft and the far end is attached with a fin, wherein each blade is perpendicularly attached to an elongate axis of the first shaft;
a first pulley wheel attached to the first shaft, wherein when the turbine structure rotates, the turbine structure causes the first shaft to rotate which causes the first pulley wheel to rotate;
a second pulley wheel attached to a second shaft, the second pulley wheel coupled to the first pulley wheel via a belt or gear mechanism, wherein when the first pulley wheel rotates, the first pulley wheel drives the second pulley to rotate via the belt or gear mechanism;
an electricity generator attached to the second shaft, wherein when the second pulley wheel rotates, the second pulley wheel causes the second shaft to rotate which enables the electricity generator to generate electricity; and
a platform horizontally positioned above a water surface to support the first shaft of the turbine structure and the second shaft, wherein the first shaft is attached to the platform with an inclining angle with respect to the water surface that is greater than zero degree and less than 90 degrees,
wherein a fin of each blade of the turbine structure can be rotated into the water surface from an entry point, pushed by water waves, and rotated out from the water surface from an exiting point, wherein the inclining angle is configured such that a distance and time for each fin to travel under the water surface between the entry point and exiting point are maximized while the fin travels near to the water surface, and
wherein before a fin of a first of the plurality of blades is completely rotated out from the exiting point of the water surface, a fin of at least a second of the plurality of blades has been completely rotated into the entry point of the water surface, such that there is a fin of at least one of the blades is under the water surface at any given time.

15. The apparatus of claim 14, wherein the first shaft and second shaft are positioned in parallel to each other.

16. The apparatus of claim 14, wherein the second shaft is positioned perpendicular to the platform.

17. The apparatus of claim 14, further comprising:
a first tubular shell fixedly and perpendicularly attached to the platform, wherein the first shaft is disposed within a first tunnel of the first tubular shell and is freely rotatable within the first tunnel;
a set of at least two ball bearings disposed between an outer surface of the first shaft and an inner surface of the first tubular shell to reduce friction between the first shaft and the first tubular shell when the first shaft rotates within the first tunnel, wherein the set of at least two ball bearings comprises a first upper ball bearing disposed near a first top end of the first shaft and a first lower ball bearing disposed near a first bottom end of the first shaft;
a ratchet mechanism disposed on the first upper ball bearing to restrict the first shaft to rotate in a single direction within the first tubular shell; and
a lubricated hard metal ball disposed between a bottom surface of the first lower end of the first shaft and a surface of the upper deck to further reduce friction between the first shaft and the upper deck when the first shaft rotates within the first tunnel.

18. The apparatus of claim 17, further comprising:
a second tubular shell fixedly and perpendicularly attached to the upper deck of the platform, wherein the second shaft is disposed within a second tunnel of the second tubular shell and is freely rotatable within the second tunnel;
a set of at least two ball bearings disposed between an outer surface of the second shaft and an inner surface of the second tubular shell to reduce friction between the second shaft and the second tubular shell when the second shaft rotates within the second tunnel, wherein the set of at least two ball bearings comprises a second upper ball bearing disposed near a second top end of the second shaft and a second lower ball bearing disposed near a second bottom end of the second shaft;
a first magnet attached to the second lower end of the second shaft; and
a second magnet disposed between the second lower end of the second shaft and a surface of the upper deck, wherein the first magnet and the second magnet have an identical polarity, such that the first and second magnets reject from each other due to magnetic forces generated from the first and second magnets, to further reduce friction between the second shaft and the upper deck when the second shaft rotates within the second tunnel.

19. The apparatus of claim 18, wherein the inclining angle of the first shaft is approximately 70 degrees, wherein an elongate arm of each blade is at least 15 meter long, wherein a contacting area of a fin of each blade is approximately 1.5 square meters, wherein a fin of each blade is attached to the corresponding elongate arm titled with an angle approximately 110 degrees, and wherein a diameter of the first pulley wheel is approximately 8 feet long and a diameter of the second pulley wheel is approximately 2 feet long.

20. An apparatus for converting kinetic energy of water waves to electrical power, the apparatus comprising:
   a turbine structure having a plurality of blades evenly attached to a first shaft, each blade including an elongate arm having a near end and a far end, wherein the near end is fixedly attached to the first shaft and the far end is attached with a fin, wherein each blade is perpendicularly attached to an elongate axis of the first shaft;
   a first pulley wheel attached to the first shaft, wherein when the turbine structure rotates, the turbine structure causes the first shaft to rotate which causes the first pulley wheel to rotate;
   a second pulley wheel attached to a second shaft, the second pulley wheel coupled to the first pulley wheel via a belt or gear mechanism, wherein when the first pulley wheel rotates, the first pulley wheel drives the second pulley to rotate via the belt or gear mechanism;
   an electricity generator attached to the second shaft, wherein when the second pulley wheel rotates, the second pulley wheel causes the second shaft to rotate which enables the electricity generator to generate electricity; and
   a platform horizontally positioned above a water surface to support the first shaft of the turbine structure and the second shaft, wherein the first shaft is attached to the platform with an inclining angle with respect to the water surface that is greater than zero degree and less than 90 degrees,
   wherein a fin of each blade of the turbine structure can be rotated into the water surface from an entry point, pushed by water waves, and rotated out from the water surface from an exiting point, wherein the inclining angle is configured such that a distance and time for each fin to travel under the water surface between the entry point and exiting point are maximized while the fin travels near to the water surface,
   wherein before a fin of a first of the plurality of blades is completely rotated out from the exiting point of the water surface, a fin of at least a second of the plurality of blades has been completely rotated into the entry point of the water surface, such that there is a fin of at least one of the blades is under the water surface at any given time, and
   wherein the inclining angle of the first shaft is approximately 70 degrees, wherein an elongate arm of each blade is at least 15 meter long, wherein a contacting area of a fin of each blade is approximately 1.5 square meters, wherein a fin of each blade is attached to the corresponding elongate arm titled with an angle approximately 110 degrees, and wherein a diameter of the first pulley wheel is approximately 8 feet long and a diameter of the second pulley wheel is approximately 2 feet long.

* * * * *